United States Patent [19]

Mueller et al.

[11] 4,158,485

[45] Jun. 19, 1979

[54] LIQUID CRYSTAL CELL WITH A GLASS SOLDER SEAL

[75] Inventors: Werner Mueller, Neu-Germering; Christoph Rotter; Wolfgang Welsch, both of Munich, all of Fed. Rep. of Germany

[73] Assignee: Siemens Aktiengesellschaft, Berlin & Munich, Fed. Rep. of Germany

[21] Appl. No.: 885,200

[22] Filed: Mar. 10, 1978

Related U.S. Application Data

[63] Continuation of Ser. No. 655,506, Feb. 5, 1976, abandoned.

[30] Foreign Application Priority Data

Feb. 10, 1975 [DE] Fed. Rep. of Germany ....... 2505513

[51] Int. Cl.$^2$ ................................. G02F 1/13
[52] U.S. Cl. .................... 350/343; 350/344; 65/58
[58] Field of Search ............. 350/343, 344; 65/58

[56] References Cited

U.S. PATENT DOCUMENTS

| | | | |
|---|---|---|---|
| 3,862,830 | 1/1975 | Stern | 350/344 X |
| 3,960,534 | 6/1976 | Oates | 350/343 X |
| 3,995,941 | 12/1976 | Nagahara et al. | 350/343 |
| 4,050,786 | 9/1977 | Feldman | 350/344 |

Primary Examiner—Edward S. Bauer
Attorney, Agent, or Firm—Hill, Van Santen, Steadman, Chiara & Simpson

[57] ABSTRACT

A liquid crystal cell having a chamber for receiving a layer of liquid crystal material which chamber is defined by a pair of plate members joined together adjacent their edges by a substantially continuous glass solder seal characterized by the glass solder seal being provided in the form of one or more glass fibers which are interposed between the plates and fused to form the glass solder seal. To facilitate positioning the one or more glass solder fibers, positioning means are provided on one surface of one of the plates and may be protruberances which are formed either by crystallizing glass solder, or by laser bombardment of the one surface. To facilitate the obtaining of the desired spacing between the plates, each of the glass fibers may have a core which may be either hard glass or a metal such as gold which core is surrounded by a lower melting glass so that during fusion of the fiber, the core remains substantially unmelted. In another embodiment, the glass fibers contain a material, such as being impregnated with CuO, which will absorb infrared radiation so that during the method of forming the cell, the step of heating to fuse the fibers includes subjecting the fibers to infrared radiation after preheating the assembled plates and fibers.

8 Claims, 2 Drawing Figures

LIQUID CRYSTAL CELL WITH A GLASS SOLDER SEAL

This is a continuation of application Ser. No. 655,506, filed Feb. 5, 1976 and now abandoned.

BACKGROUND OF THE INVENTION

1. Field of the Invention

The present invention relates to a liquid crystal cell and method of making the cell. The liquid crystal cell has a chamber for receiving a layer of liquid crystal material and the chamber is formed between a pair of plates whose facing surfaces are each provided with electrically conducting coatings and are joined together adjacent their edges by a hermetical, glass solder seal.

2. Prior Art

The life duration of a cell of a liquid crystal display is basically dependent on the quality of the seal between the plates which form the chamber for receiving the liquid crystal layer. Previously adhesives, such as hardenable synthetic resins, were used and have the advantage that they were relatively simple to handle. However, these synthetic resins would react irreversibly with the material of the liquid crystal layer and gradually allow both atmospheric moisture and atmospheric oxygen to penetrate into the cell to react with the material of the liquid crystal layer. Such a reaction with a liquid crystal layer will cause the layer to loose its desired quality and finally cause the liquid crystal cell to become unserviceable and inoperative. Another disadvantage with the synthetic resin seal is that at high operating temperatures, a danger exists that the material of the liquid crystal layer will leak out of the cell between one of the plates and the adhesive.

For these reasons, the use of glass solder has been recently adopted as a method of sealing the plates forming the chamber of the cell. A seal of this type will practically consist of only inorganic components and will not react or attack the material of the liquid crystal layer. Also, the glass solder provides long term protection from environmental influences. However, the use of glass solder as a seal requires a plurality of expensive and, in particular, time consuming production steps. For example, a solder paste, which is formed of pieces of glass solder and an organic binding agent, is applied to a surface of the plate by a silk screen printing process and in the desired pattern to form a frame of glass solder on the surface. Subsequent to applying the frame with a silk screen printing process, the glass solder frame is subjected to a premelting or preglazing process which involves heating to remove the organic binding agent and to fix the glass particles of the solder to the surface of the plate. This heating removes the organic bonding agent by a combustion process which does not leave any residue in the remaining glass solder frame. After the premelting or preglazing, a second plate is then placed on the frame to form an assembly which is then finally joined together in a second melting process to form a sealed chamber of the cell. Examples of these types of methods of forming a liquid crystal cell is disclosed in British Patent No. 1,387,677, which corresponds to German Offenlegungsschrift No. 2,254,940.

In the above-mentioned reference, spacing particles such as glass fibers or hard glass particles may be included in the glass solder paste. During the melting or fusing of the solder paste to form the seal, these spacing particles would remain substantially unchanged and provide permanent spacing elements to provide spacing between the plate members.

SUMMARY OF THE INVENTION

The present invention is directed to a liquid crystal cell and the method of producing the liquid crystal cell, which method and cell utilize a glass solder seal which is produced in a simple and rapid fashion. To accomplish this task, a liquid crystal cell comprising at least two plate members each having a surface with at least a portion thereof having an electrical conducting coating thereon, and means for hermetically sealing said plate members together adjacent their edges and in spaced relationship with said coatings facing each other and plane parallel to form a chamber for receiving a layer of liquid crystal material has the improvement comprising the sealing means comprising and being formed by at least one melted glass solder fiber so that melting of the glass fiber forms a glass solder seal between the plate members. The method of forming the cell comprises the step of providing the pair of plate members, positioning at least one glass solder fiber in a predetermined position on a surface and adjacent the edges of one of said pair of plate members, placing the other of said plate members with its surface engaging the glass solder fiber to form an assembly and then subsequently heating the assembly to fuse the glass solder fiber to form a hermetic glass solder seal between the two plates to form the chamber defined thereby.

A glass solder fiber will contain no organic bonding agent and therefore the steps of silk screen printing and preglazing which were required in the prior art process of forming a glass solder seal are eliminated. According to the present invention in order to form the desired frame pattern, the fiber must simply be placed onto an appropriate point adjacent the edge of one of the plates, assemble the other plate onto the fibers on the first plate with the other plate acting to apply weight thereto, heating to fuse the fibers to create the seal. The end result is that the sealing process or method is substantially simplified and shortened in comparison to conventional techniques although the advantages of a glass solder seal are still retained.

To facilitate positioning of the glass solder fiber forming the glass solder frame in a desired fixed position on the one surface of the one plate, positioning means may be utilized. These positioning means may include protuberances or elevations which are formed of crystalizing glass solder or may be formed by protrusions or upheavals produced by bombarding the one surface of the one plate with a laser bombardment. The positioning means may also be simple recesses formed in the surface of the plates such as by scratching lines therein.

If it is desirable to increase the mechanical stability of the proposed glass solder fiber frame, it is advisable to provide fibers with a core of either hard glass or metal such as gold. When using fibers having a hard glass or metal core and surrounded by a meltable glass, the core should have a diameter of approximately one-tenth of the diameter of the fiber.

The stable fiber cores and also the protrusions or elevations consisting of crystalizing glass solder can also be used simultaneously to provide a specific set distance or spacing between the two plates. The desired distance between the plates can also be produced by inserting spacing components between the plates prior to the fusion process and then subsequently removing the spacing components after the fusion process during which the upper or second plate has moved towards the first plate due to fusing of the glass fibers.

In some applications of a liquid crystal cell, the liquid crystal layer is exposed to a light source which is not arranged at the front or rear of the cell but is disposed at the side so that it passes through the glass solder frame. In such an arrangement a particularly high light yield would be expected due to the results of multiple reflection. However, the actual yield from cells having glass solder seals produced in accordance with the prior art is low. This low yield is due to small holes and inclusions which are created during the step of burning or removing the organic binding agent from the solder paste. These small holes and inclusions will act as light dispersing or scattering centers. These dispersion or scattering centers cause considerable and uncontrollable obstruction of the illumination of the particular liquid crystal cell. In comparison, the seal of the liquid crystal cell produced in accordance with the present invention is completely free of the above mentioned irregular light dispersing or scattering interference sources. Thus, an inherently favorable side illumination of the cell can be fully exploited and can lead to an optimum contrast ratio.

The already reduced time required for the production of a liquid crystal cell in accordance with the present invention due to elimination of the steps of silk screening the solder paste and the subsequent preglazing or premelting step can be further reduced by utilizing infrared light to melt or fuse the glass solder fibers. To use infrared light, the fiber must absorb the infrared radiation and this absorption can be produced by impregnating the material of the fiber with an infrared radiation absorbent material. For example, the solder fiber may be entriched or impregnated with CuO. When using fibers which will absorb infrared radiation, the steps of heating to melt the fibers require only a few minutes of time instead of the hours which were required by the previous prior art method. For example, the assembly of plates and fibers is preheated to approximately 400° C. and then subjected to infrared radiation for a few minutes to cause the fusion of the glass solder fibers. In comparison, the prior art method required elevating the assembly to a given temperature of approximately 300° C., holding the assembly at this temperature for at least 30 minutes, then elevating to a second temperature in a range of 400°–500° C. and holding for at least 30 minutes at this temperature. In addition to reducing the time required for making the seal, the fusion of the glass fibers using infrared radiation imposes a comparatively small stress on the various elements of the assembly. If infrared radiation is being utilized to fuse the solder glass fibers and if the positioning means are being formed by using crystalizing glass solder, then the crystalizing glass solder should also consist of a material which will absorb infrared radiation and therefore be infrared fusible.

DESCRIPTION OF THE PREFERRED EMBODIMENTS

Figure 1:
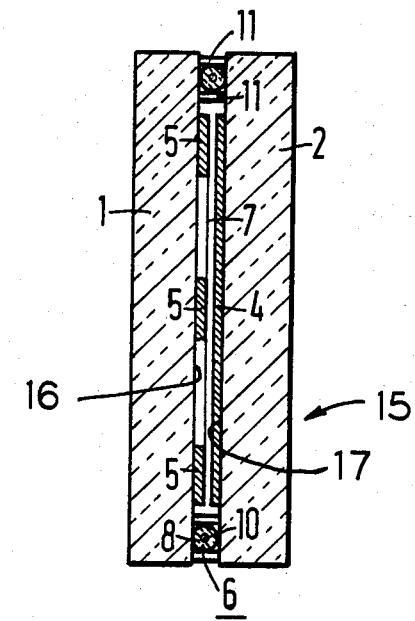
FIG. 1 is a cross-sectional view of a liquid crystal cell in accordance with the present invention.

The principles of the present invention are particularly useful when incorporated in a liquid crystal cell generally indicated at 15 in FIG. 1.

Figure 2:
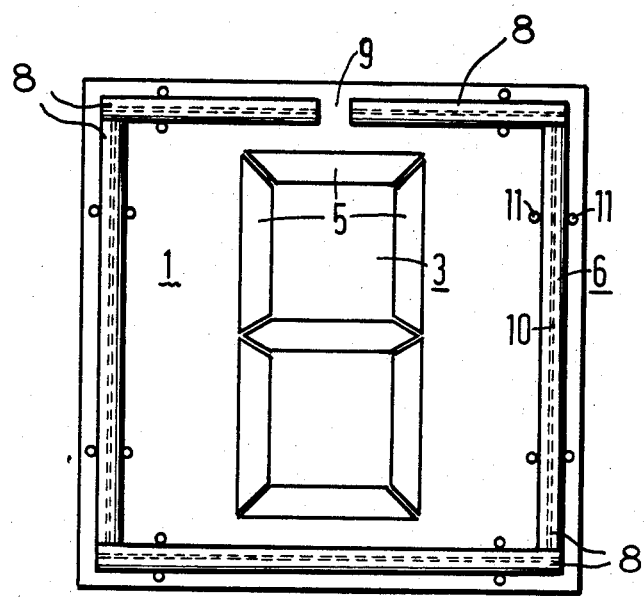
FIG. 2 is a plan view of a carrier member with the fibers disposed thereon prior to assembly of the second plate and fusion.

The cell 15 is formed of a pair of plate members comprising a front plate 1 having a flat plane surface 16 and a rear plate 2 having a flat plane surface 17. The front plate 1 on the surface 16 is provided with transparent electrically conducting coatings composed of segments 5 which segments form a front segmented electrode 3 (FIG. 2). The rear plate 2 is illustrated as being provided with a rear electrode 4 which is a continuous coating of electrically conductive material which may be either transparent to light or be a reflective coating. The two plates are hermetically sealed to one another via a glass solder frame 6 at a specific distance from one another to form a chamber 7 which receives the liquid crystal layer. The specific distance ensures that the facing surfaces 16 and 17 of the front and rear plate members 1 and 2 are arranged in plane parallel spaced relationship. It should be noted that structural components of the cell 15, which are not absolutely necessary for understanding of the present invention for example, the electrical leads for the various segments 5, have been omitted from the drawings.

The glass solder seal frame 6 is formed from one or more glass solder fibers 8 which are positioned on a plate member such as the front plate member 1 adjacent the edges thereof. As illustrated in FIG. 2, a plurality of glass solder fibers 8 are utilized with a gap 9 being provided to allow the introduction of a cleaning material after fusion of the frame, and the introduction of the material of the liquid crystal layer into the chamber 7. As best illustrated in the drawings, each of the fibers has a core 10, which may be either a hard glass core or a metal core such as gold. To aid in positioning each of the fibers, positioning means illustrated as projections 11 are provided. These projections may be formed by utilizing crystalizing glass solder or may be formed by bombarding the plate 1 with a laser beam to cause the protrusions or upheavals.

A liquid crystal cell such as illustrated in FIG. 1 is produced by the following method. To form the frame 6, the glass solder fibers 8 are positioned on one of the plate members such as the front plate member 1 with the aid of the positioning means comprising the protrusions 11. It is noted that both the plates 1 and 2 are provided with their particular electrode structure prior to positioning the glass fibers thereon. After positioning the glass fibers, the second plate is placed on the positioned fibers to form an assembly. The assembly is then heated to fuse the glass fibers which join the two plates 1 and 2 with a hermetical seal.

In order to decrease the time of heating, the glass fibers 8 may be impregnated with an infrared absorbing material such as CuO. If the fibers are infrared absorbing, the heating step includes preheating the assembly to approximately 400° and then subjecting the fibers to the infrared radiation. In the event that infrared radiation is desired for use in forming the projections 11, a crystalizing glass solder which also absorbs infrared radiation may be utilized.

It should be noted that the core 10 may be either a metal or a hard glass core which does not soften appreciably at the temperatures required to soften the meltable surrounding glass material. When the fibers, which either have the core or are coreless, include the absorbing component, the method will include the use of infrared radiation during the heating step.

Although various minor modifications may be suggested by those versed in the art, it should be understood that we wish to employ within the scope of the patent granted hereon, all such modifications as reasonably and properly come within the scope of our contribution to the art.

We claim:

1. A method for producing a liquid crystal cell having a chamber for receiving a layer of liquid crystal material, said chamber being defined by a pair of plate members joined together adjacent their edges by a substantially continuous means for hermetically sealing the plate members together in spaced relationship with the facing surfaces of the plate members being plane parallel and each of said facing surfaces having at least one portion provided with an electrically conducting coating, said means for sealing including a glass solder frame, said method comprising the steps of providing a pair of plate members, providing a glass solder frame on one of said pair of plate members by positioning at least one fiber consisting of a glass solder material free of any organic bonding agent in a predetermined position on a surface and adjacent the edges of said one plate member, placing the other of said pair of plate members with its surface engaging the glass solder frame of the glass solder fiber to form an assembly, and then subsequently heating the assembly to fuse the glass solder fiber to form a hermetic glass solder seal between the two plates to join the plates together to form the chamber defined thereby.

2. A method according to claim 1, wherein the step of positioning the glass fibers in said frame includes forming positioning means on the surface of said one plate member to fix the position of the glass fiber thereon.

3. A method according to claim 2, wherein the step of forming position means comprises subjecting the surface of said one plate member to laser bombardment to create protruberances thereon.

4. A method according to claim 2, wherein the step of forming positioning means comprises providing crystalizing glass solder at discrete places on said surface of said one plate member, heating the crystalizing glass solder to produce glass crystal protruberances thereon.

5. A method according to claim 1, wherein each of said glass fibers comprises a hard glass core surrounded by meltable glass so that during the step of heating, said core acts as means for providing a predetermined spacing between the surfaces of the pair of plate members.

6. A method according to claim 1, wherein each of said glass fibers comprises a metal core surrounded by a meltable glass so that during the step of heating, said metal core provides means for providing a predetermined spacing between the surfaces of the pair of plate members.

7. A process according to claim 1, wherein each of the glass fibers absorbs infrared radiation, and wherein the step of heating includes preheating the assembly to a given temperature and then subjecting the assembly to infrared radiation to cause fusion of each of the glass fibers to form the glass solder seal.

8. A process according to claim 7, wherein each of the glass fibers is impregnated with an infrared absorbent component such as CuO.

* * * * *